United States Patent
Zou

(10) Patent No.: US 9,760,972 B2
(45) Date of Patent: Sep. 12, 2017

(54) RENDERING METHOD AND ASSOCIATED DEVICE

(71) Applicant: MStar Semiconductor, Inc., Hsinchu Hsien (TW)

(72) Inventor: Jian-Qiang Zou, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 183 days.

(21) Appl. No.: 14/243,956

(22) Filed: Apr. 3, 2014

(65) Prior Publication Data

US 2014/0300616 A1   Oct. 9, 2014

(30) Foreign Application Priority Data

Apr. 3, 2013   (CN) .......................... 2013 1 0116978

(51) Int. Cl.
  *G06F 13/00*   (2006.01)
  *G09G 5/399*   (2006.01)
  *G06T 1/60*   (2006.01)
  *G09G 5/397*   (2006.01)
  *G09G 5/14*   (2006.01)

(52) U.S. Cl.
  CPC ................. *G06T 1/60* (2013.01); *G09G 5/14* (2013.01); *G09G 5/397* (2013.01)

(58) Field of Classification Search
  CPC .......... G09G 5/39; G09G 5/393; G09G 5/363; G09G 5/399; G09G 2360/123
  USPC .......................................... 345/536–540, 545
  See application file for complete search history.

(56) References Cited

U.S. PATENT DOCUMENTS

| 7,477,205 B1* | 1/2009 | de Waal ................ G06F 3/1431 345/1.1 |
| 7,724,263 B2 | 5/2010 | Hutchins et al. |
| 2007/0216669 A1* | 9/2007 | Narui ................... G09G 3/2092 345/204 |
| 2007/0285439 A1* | 12/2007 | King ..................... G09G 5/397 345/638 |
| 2009/0102844 A1* | 4/2009 | Deparis ................. G06T 15/50 345/426 |
| 2009/0262122 A1* | 10/2009 | Darsa ...................... G09G 5/14 345/545 |

(Continued)

OTHER PUBLICATIONS

Taiwan Office Action, Jan. 8, 2015, 7 pages.

*Primary Examiner* — Gregory J Tryder
*Assistant Examiner* — Yi Yang
(74) *Attorney, Agent, or Firm* — Edell, Shapiro & Finnan, LLC

(57) ABSTRACT

A rendering method is provided. The method includes: initializing a surface flinger to establish at least two buffer memories; confirming correspondence between all visible surfaces and the at least two buffer memories, rendering all of the visible surfaces to the corresponding buffer memories according to the correspondence, and combining all of the buffer memories to output a result for display; determining whether a change occurs in the visible surfaces; when the change occurs in the visible surfaces, identifying the buffer memory where the visible surface with the change is located; rendering again the visible surfaces that need to be rendered in the identified buffer memory, and combining the buffer memory that is rendered again with the buffer memory that is not rendered again to output a result for display.

8 Claims, 5 Drawing Sheets

(56) References Cited

U.S. PATENT DOCUMENTS

2010/0128171 A1\* 5/2010 Yasuoka .............. H04N 7/0115
348/452
2013/0236125 A1\* 9/2013 Kim ....................... H04N 21/25
382/305

\* cited by examiner

RENDERING METHOD AND ASSOCIATED DEVICE

This application claims the benefit of People's Republic of China application Serial No. 201310116978.X, filed Apr. 3, 2013, the subject matter of which is incorporated herein by reference.

BACKGROUND OF THE INVENTION

Field of the Invention

The invention relates to a rendering method and an associated device.

Description of the Related Art

A rendering method of a common surface flinger involves only one single frame buffer. That is, all surfaces of upper-layer applications are rendered to one frame buffer. During rendering, an upper-layer application sends a rendering request to the surface flinger, which replies to the request and obtains the surface of the application to the frame buffer. The rendering result is then displayed to a user.

Multiple upper-layer applications frequently co-exist in one system. When practicing rendering that involves only one single frame buffer, a change occurring in one of the upper-layer applications may cause changes in the remaining upper-layer applications. When a particular upper-layer is constantly refreshed in the above rendering method, overall system efficiency may be severely degraded.

SUMMARY OF THE INVENTION

The invention is directed to a rendering method and an associated device, which are capable of reducing the quantity of surfaces that need to be rendered again due to refreshing a particular upper-layer application, thereby optimizing rendering performance as well as enhancing overall system efficiency.

According to an aspect of the present invention, a rendering method is provided. The method includes: initializing a surface flinger to establish at least two frame buffers; confirming correspondence between all visible surfaces and the at least two frame buffers, and rendering all visible surfaces to the corresponding frame buffers according to the correspondence, combining the frame buffers to output a result for display; determining whether a change occurs in the visible surfaces; identifying the frame buffer where the visible surface with the change is located when the change occurs in the visible surfaces; rendering again the visible surfaces that need to be rendered in the frame buffer, and combining the frame buffer that is rendered again with the frame buffer that is not rendered again to output a result for display.

According to another aspect of the present invention, a rendering device is provided. The device includes: a buffer memory establishing module, a first rendering module, a determining module, a second rendering module and a display module. The buffer memory establishing module initializes a surface flinger to establish at least two buffer memories. The first rendering module confirms correspondence between all visible surfaces and the at least two buffer memories established by the buffer memory establishing module, and respectively renders all of the visible surfaces to the corresponding memory buffers according to the correspondence. The determining module determines whether a change occurs in the visible surfaces. When a change occurs in the visible surfaces, the second rendering module identifies the buffer memory where the visible surface with the change is located, and renders the visible surfaces that need to be rendered in the identified buffer memory. After the first rendering module and the second rendering module complete rendering, the display module combines all the buffer memories to output a result for display.

Compared to the prior art, the present invention offers the following advantages. Multiple buffer memories are adopted for rendering, with the rendering process of each buffer memory being independent. When a change occurs in one of the buffer memories, only the visible surfaces in the buffer memory where the visible surface with the change are determined whether they are affected, and the quantity of visible surfaces that need to be rendered due to a rendering process of an upper-layer application can be reduced, thereby rendering performance and enhancing system efficiency.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
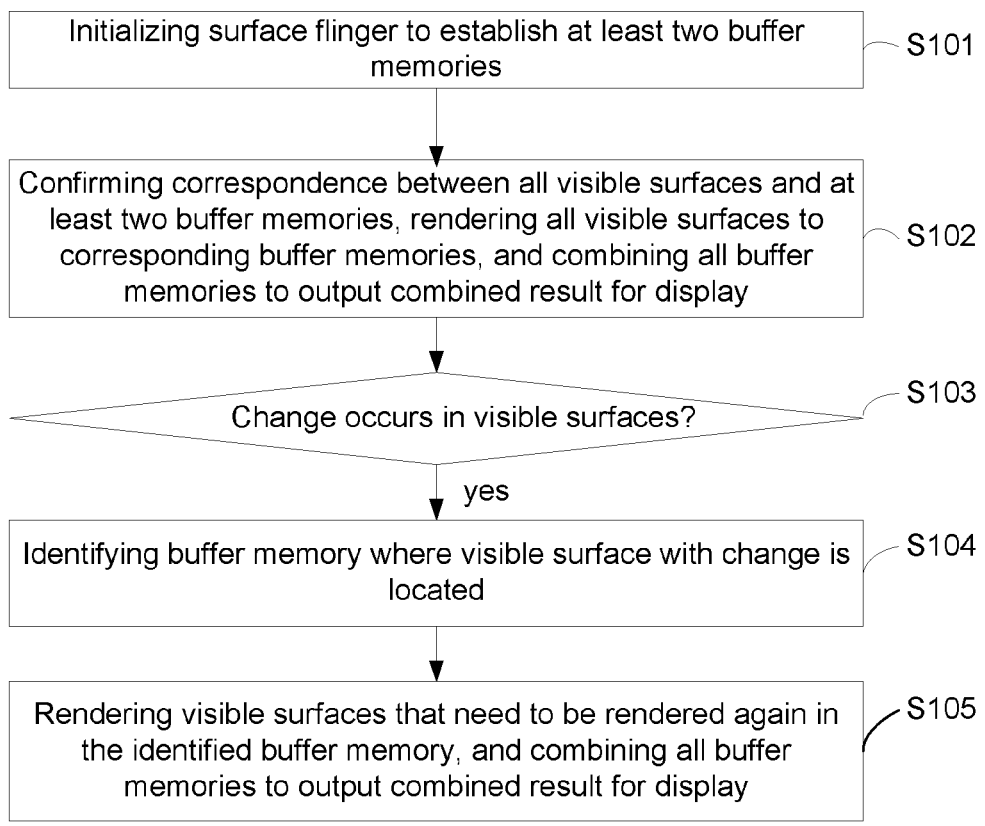
FIG. 1 is a flowchart of a rendering method according to an embodiment of the present invention.

Referring to FIG. 1, a rendering method according to an embodiment of the present invention includes the following steps.

In step S101: a surface flinger is initialized to establish at least two buffer memories.

In a common operating system, rendering is needed before opening each application to obtain a final display result presented to a user. In the rendering process, data provided by a user is consolidated to generate one frame or a series of motion pictures, which are outputted according to a method designated by the user. In an embodiment of the present invention, rendering is a process for visualizing an application program. For example, to open an application in an Android system, a refresh request is sent to a surface flinger in the Android system. The system obtains a surface of the application in response to the request and renders the surface to a frame buffer, and the surface is then displayed to the user. The surface flinger is a tool that the system employs for graphics, the buffer memory is generated by the surface flinger, and the surface of the application is rendered to the buffer memory. In the surface flinger, one buffer memory is in equivalent to a frame buffer native window. Therefore, a frame buffer, also referred to as a frame buffer memory or a buffer memory, is a direct image presented by a display image of a screen, and may be further be referred to as a bitmap or a grating. Each storing unit in the frame buffer memory corresponds to one pixel on the screen, and the entire frame buffer memory corresponds to one frame.

During the initialization of the surface flinger, display hardware is established, and at least two buffer memories are established by the display hardware. Further, resolutions of the buffer memories established in response to the request and a resolution of a current operating system are the same.

In step S102, correspondence between all visible surfaces and the at least two buffer memories is confirmed, all of the visible surfaces are respectively rendered to the corresponding buffer memories, and all the buffer memories are combined to output a result for display.

The correspondence of all of the visible surfaces and all the buffer memories established is confirmed, and all of the visible surfaces are respectively rendered to the corresponding buffer memories according to the correspondence. A visible surface is a part of an application program. When opening one application program, a visible surface of the application program needs to be first rendered to obtain a final display result that is outputted to a user. During the rendering process, all visible surfaces that are stacked above one another are rendered from a lowermost layer in an upward direction. The Z-axis that represents the depth is usually utilized to represent a position relationship of visible surfaces. A visible surface with a large Z-axis value is above a visible surface with a small Z-axis value. Thus, starting from the visible surface with the smallest Z-axis value, the rendering process is sequentially performed on the corresponding visible surfaces according to an increasing order of Z-axis values. After all of the visible surfaces are rendered, all of the buffer memories are combined to output a result for display. Combining the rendered surfaces is a further process on the rendered surfaces to provide an enhanced display effect. The combination includes collecting all sorts of data required by a final scene, combining or connecting one section of motion pictures with another section of motion pictures, inserting effects into a video and fabricating scene transitions, thereby providing more vivid effects to a final display image.

In step S103, it is determined whether a change occurs in the visible surfaces.

It is determined whether a change occurs in the visible surfaces. Step S104 is performed when a change occurs, or else no operation is performed if no change occurs.

In step S104, the buffer memory where the visible surface with the change is located is identified.

After completing steps S101 and S102, when a change occurs in one of the visible surfaces, e.g., a power-on event takes place or a new application is opened, the visible surface with the change needs to be rendered again. Further, when the visible surface with the change overlaps (directly overlapping or indirectly overlapping) with other visible surfaces in one buffer memory, the other visible surfaces in the same buffer memory also need to be rendered again. Thus, when a change occurs in one visible surface A, the memory buffer where the visible surface A is located is first identified. Next, other visible surfaces that overlap with the visible surface A in the same memory buffer are also identified. The visible surface A and the visible surfaces that overlap with the visible surface A are all visible surfaces that need to be rendered again.

In step S105, the visible surfaces, identified from the buffer memory and needing to be rendered again, are rendered, and all of the buffer memories are combined to output a result for display.

All of the identified visible surfaces that need to be rendered again are rendered. The rendering process is also sequentially performed from the lowermost layer of the visible surfaces in an upward direction until all of the visible surfaces that need to be rendered again are rendered to the current buffer memory. The current buffer memory is combined with other buffer memory to output a result for display.

Different from the prior art, as demonstrated by the above embodiment of the present invention, multiple buffer memories are adopted for rendering, with the rendering process for each of the buffer memories being independent. When a change occurs in a visible surface of one buffer memory, it is considered whether the buffer memory where the visible surface with the change is located is affected, and operations are performed on only the buffer memory that needs to be rendered again. As such, the quantity of affected visible surfaces due to an upper-layer application that needs to be rendered is reduced, thereby optimizing rendering performance and enhancing overall system efficiency.

Figure 2:
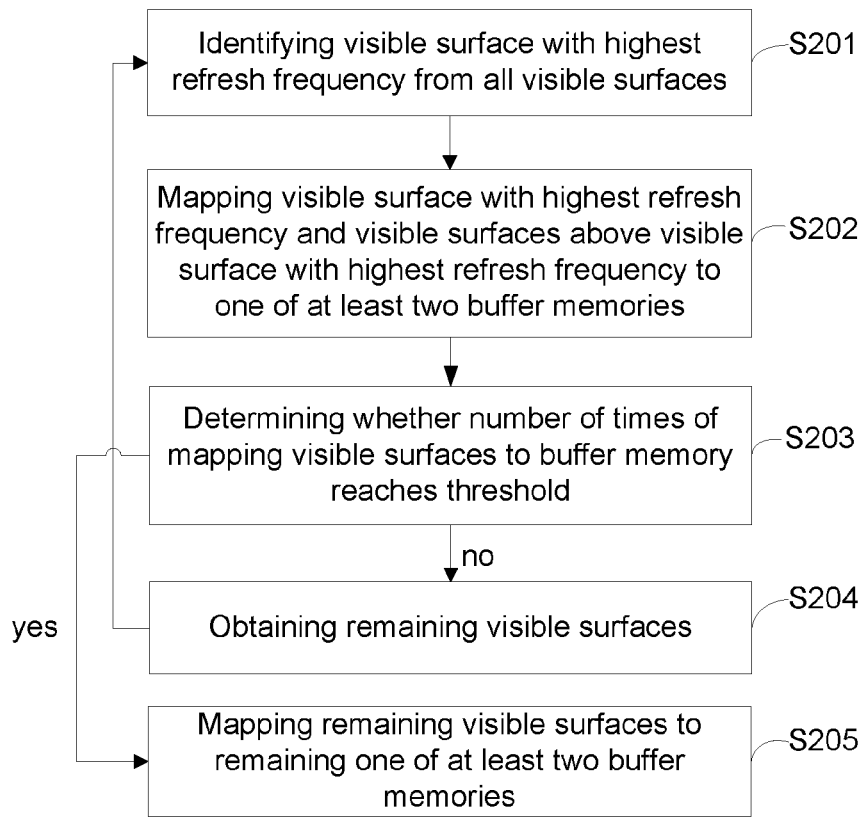
FIG. 2 is a flowchart of confirming correspondence between all visible surfaces and at least two frame buffers in a rendering method according to an embodiment of the present invention.

Referring to FIG. 2, according to another embodiment, the step of confirming the correspondence between all of the visible surfaces and the at least to buffer memories includes the following sub-steps.

In sub-step S201, the visible surface with a highest refresh frequency is identified from all of the visible surfaces.

All of the visible surfaces are obtained, and the visible surface with the highest refresh frequency is identified from all of the visible surfaces. For distinction purposes, of all of the visible surfaces, the visible surface with the highest refresh frequency is defined as a first visible surface. Marking the visible surface as a boundary, the visible surfaces above the visible surface are obtained. The visible surface with the highest refresh frequency and the visible surfaces above that visible surface are regarded as one group, and are rendered to the same buffer memory.

In sub-step S202, the visible surface with the highest refresh frequency and the visible surfaces above that visible surface are mapped to one of the at least two buffer memories.

The visible surface with the highest refresh frequency and the visible surfaces above that visible surface are mapped to one of the at least two buffer memories established. Under normal circumstances, the buffer memory to which a visible surface is mapped is designated by a request sent from an application (client), and the surface flinger is only required to locate the corresponding visible surface according to the client's request and render the visible surface to the buffer memory designated by the client.

In sub-step S203, it is determined whether the number of times of mapping the visible surface to the buffer memory reaches a threshold.

The threshold refers to a difference between the quantity of buffer memories and one. For example, when ten buffer memories are established, the threshold is nine. After completing sub-steps S201 and S202, it is determined whether the number of times of mapping to the visible surface to the buffer memory reaches the threshold. Sub-step S205 is performed when the threshold is reached, or else step sub-step S204 is performed when the threshold is not reached.

In sub-step S204, the remaining visible surfaces are obtained.

When the number of times of mapping the visible surface does not reach the threshold, the remaining visible surfaces after completing sub-step S202 are obtained. That is, sub-step S201 is iterated to similarly divide and obtain another group of visible surfaces, and this group of visible surfaces are mapped to any other buffer memory (i.e., designated according to the client) except the buffer memory previously mapped with the visible surfaces. The above process is performed until all the number of times of mapping all of the visible surfaces to the buffer memories reaches the threshold. For distinction purposes, according to an embodiment of the present invention, the visible surface with the highest refresh frequency identified from the remaining visible surfaces after completing sub-step S202 is defined as a second visible surface. That is to say, the second visible surface is defined for distinction from the visible surface with the highest refresh frequency of all of the visible surfaces, and may not be a physical visible surface. Under many circumstances, the second visible surface may be multiple different visible surfaces.

In sub-step S205, the remaining of the all of the visible surfaces are mapped to the remaining one buffer memory of the at least two buffer memories.

When the number of mapping the visible surfaces reaches the threshold, the remaining of all of the visible surfaces are mapped to one buffer memory, so as to confirm the correspondence between all of the visible surfaces and all of the buffers.

An example is given below to illustrate the process of confirming the correspondence between the visible surfaces and the buffer memories. Assume that four buffer memories (numbered A, B, C and D) are established, and 101 visible surfaces are numbered 0 to 100 according to a top-to-bottom position relationship of the 101 visible surfaces. That is, the visible surface 0 is the lowermost visible surface, and the visible surface 100 is the uppermost surface. The visible surface with the highest refresh frequency, e.g., the visible surface 50, is identified from all of the 101 visible surfaces. The visible surfaces 50 to 100 are mapped to any of the buffer memories A, B, C and D. Assume that the visible surfaces 50 to 100 are mapped to the buffer memory B. At this point, the number of times of mapping the visible surfaces to the buffer memories is one, which does not reach a threshold of three (i.e., the difference between the number of buffer memories and one (4−1=3)), and so the visible surfaces are grouped. Among the remaining visible surfaces 0 to 49, the visible surface with the highest refresh frequency, e.g., the visible surface 30 (i.e., the above second visible surface), is identified. The visible surfaces 30 to 49 are mapped to any of the remaining buffer memories A, B and C, e.g., to the buffer memory C. At this point, the number of times of mapping the visible surfaces to the buffer memories is two, which does not reach the threshold of three, and so the visible surfaces are again grouped. Among the remaining visible surfaces 0 to 29, the visible surface with the highest refresh frequency, e.g., the visible surface 15 (i.e., another of the above second visible surface), is identified. The visible surfaces 15 to 29 are mapped to any of the remaining buffer memories A and D, e.g., to the buffer memory D. At this point, the number of times of mapping the visible surfaces to the buffer memories is three, which reaches the threshold of three. Thus, the remaining visible surface need not be further grouped. The visible surfaces 0 to 14 are mapped to the buffer memory A to complete the confirmation of the correspondence between all of the visible surfaces and all of the buffer memories. In an alternative embodiment with a greater number of buffer memories, the correspondence between all of the visible surfaces and the buffer memories can be similarly confirmed.

Figure 3:
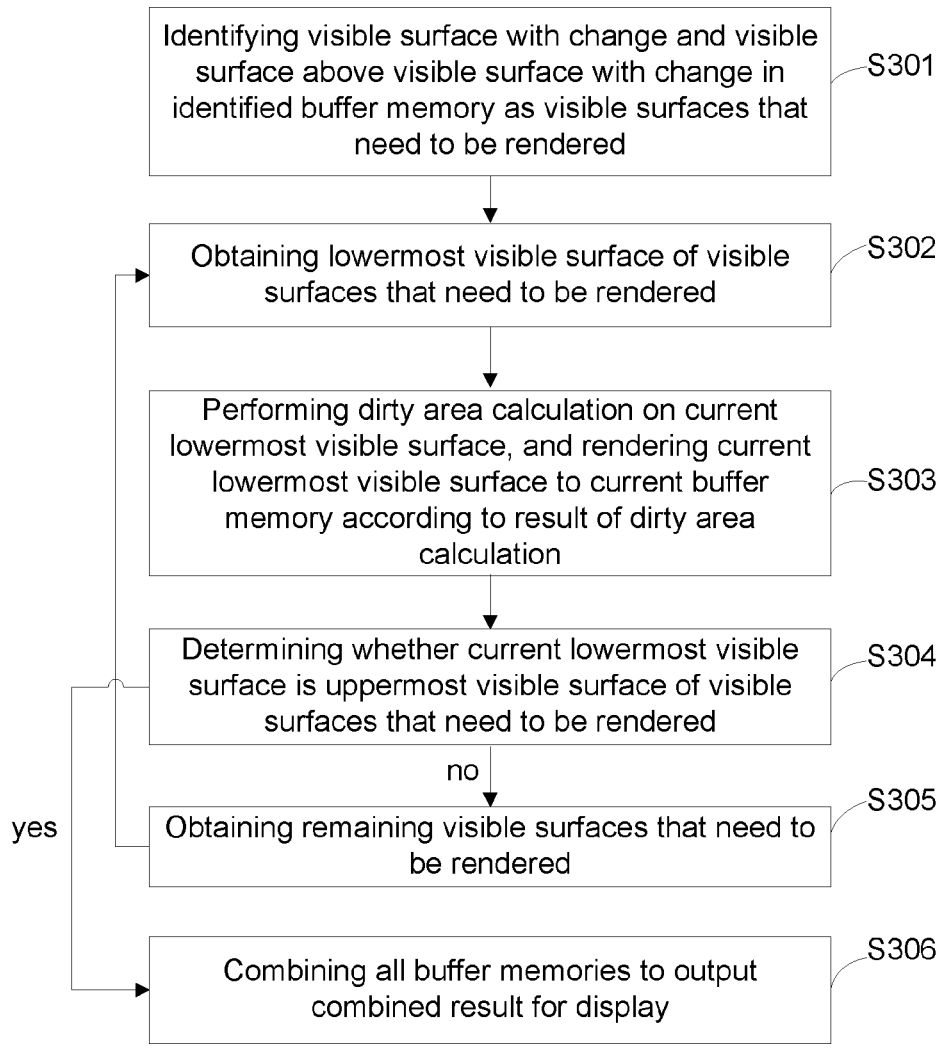
FIG. 3 is a flowchart of rendering visible surfaces that need to be rendered and identified from frame buffers in a rendering method according to an embodiment of the present invention.

Referring to FIG. 3, in another embodiment, the process of rendering visible surfaces that need to be rendered and identified from frame buffers includes the following sub-steps.

In sub-step S301, from the identified buffer memory, the visible surface with the change and the visible surfaces above that visible surface are identified as the visible surfaces that need to be rendered.

When a change occurs in one of the visible surfaces, the visible surface may need to be rendered again. Further, when the visible surface with the change overlaps (directly overlapping or indirectly overlapping) with other visible surfaces in one buffer memory, the other visible surfaces also need to be rendered again. Thus, when a change occurs in one visible surface A, the memory buffer where the visible surface A is located is first identified. Next, other visible surfaces that overlap with the visible surface A in the memory buffer are also identified. The visible surface A and the visible surfaces that overlap with the visible surface A are all visible surfaces that need to be rendered again.

In sub-step S302, the lowermost visible surface of the visible surfaces that need to be rendered again is obtained.

Since the rendering process is sequentially performed from the lowermost visible surface in an upward direction, the lowermost visible surface of the visible surfaces that need to be rendered again is obtained to serve as the visible surface from which the rendering process begins.

In sub-step S303, dirty area calculation is performed on the current lowermost visible surface, and the current lowermost visible surface is rendered to the current buffer memory according to a result of the dirty area calculation.

Dirty area calculation is performed on the current lowermost visible surface. The dirty area calculation is to confirm the area that needs to be rendered in the visible surface. For example, assume a visible surface is located at a position (0, 0), and has a width of 100 and a height of 200. When the visible surface is relocated to a position (0, 50), the area with the change of relocating to the visible surface to the position (0, 50) is then located at a position (0, 0), and has a width of 150 and a height of 200. When the visible surface overlaps with the area with the change, the overlapping area is regarded as a dirty area. According to the result of the dirty area calculation, the lowermost visible surface is rendered to the current buffer memory. Thus, the loading of the rendering process can be lowered through the dirty area calculation. For example, when the visible surface and the area with the change only overlap by a small part, only the small overlapping part needs to be rendered to eliminate complications of again rendering the entire visible surface.

In sub-step S304, it is determined whether the current lowermost visible surface is the uppermost visible surface of the visible surfaces that need to be rendered again.

After completing sub-step S303, it is determined whether the current lowermost visible surface (and the visible surface rendered in sub-step S303) is the uppermost visible surface of the visible surfaces that need to be rendered again. If so, it is determined that the visible surfaces that need to be rendered again are all rendered, and sub-step S306 is performed. If not, it is determined that not all of the visible surfaces that need to be rendered again are rendered, and sub-step S305 is performed.

In sub-step S305, the remaining visible surfaces of the visible surfaces that need to be rendered are obtained.

When the current lowermost visible surface is not the uppermost visible surface of the visible surfaces that need to be rendered, the remaining visible surfaces of the visible surfaces that need to be rendered are obtained, and sub-step S302 and the subsequent operations are iterated until it is determined that the visible surfaces that need to rendered are all rendered.

In sub-step S306, all of the buffer memories are combined to output a result for display.

When the visible surfaces that need to be rendered are all rendered, all of the buffer memories are combined to output a result for display.

To better understand the rendering method of the present invention, an application process of the rendering method of the present invention is described in detail by taking an Android system as an example.

The Android system supports the establishment of two buffer memories. Thus, after initializing the surface flinger, display hardware is first established, and the display hardware then establishes two buffer memories—a first buffer memory and a second buffer memory. The resolutions of these two buffer memories are the same as the resolution of the Android operating system. A client sends a request to the surface flinger, with the request expressing that the client has the highest refresh frequency and requesting to be rendered to the first buffer memory. Upon receiving the request, the surface flinger identifies the visible surface corresponding to the client, and designates the visible surface to be rendered to be first buffer memory. The surface flinger then renders the visible surfaces above the visible surface with the highest refresh frequency to the first buffer memory. Further, the remaining visible surfaces below the visible surface with the highest refresh frequency are designated to be rendered to the second buffer memory. Thus, from the lowermost visible surface, the visible surfaces are respectively rendered to the corresponding buffer memories in an upward direction according to the correspondence. Details for confirming the correspondence between all of the visible surfaces and the two buffer memories are the same as associated details in the above embodiment, and shall be omitted herein.

Figure 4:
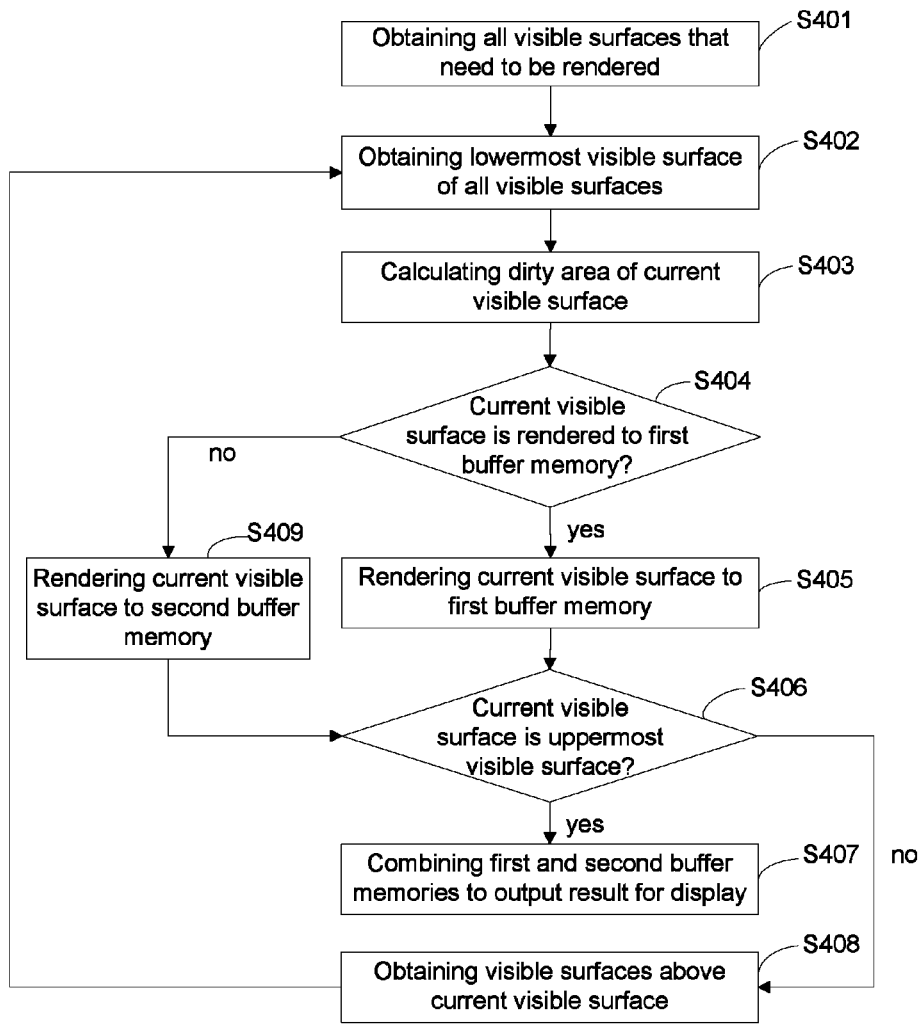
FIG. 4 is a flowchart of a rendering method according to an embodiment of the present invention.

For the Android system, after rendering all of the visible surfaces to two buffer memories, a part of the visible surfaces may need to be rendered again when a change occurs in one of the visible surfaces. Sub-steps of the process of rendering again the visible surfaces are described below with reference to FIG. 4.

In sub-step S401, all visible surfaces that need to be rendered again are obtained.

When a change occurs in one of the visible surfaces, the visible surface with the change and the visible surfaces above the visible surface with the change are identified. The visible surface with the change and the visible surfaces above the visible surface with the change are regarded as visible surfaces that need to be rendered.

In sub-step S402, the lowermost visible surface of all of the visible surfaces is obtained.

The lowermost visible surface of all of the visible surfaces that need to be rendered is obtained, and is regarded as the visible surface from which the rendering process begins.

In sub-step S403, a current dirty area is calculated.

The dirty area of the lowermost visible surface is calculated, and the rendering process is performed according to a calculation result of the dirty area.

In sub-step S404, it is determined whether the current visible surface is to be rendered to the first buffer memory.

It is determined whether the current visible surface is to be rendered to the first buffer memory. That is, it is determined whether the visible surface with the change is in the first buffer memory or the second buffer memory. Sub-step S405 is performed when the current visible surface is to be rendered to the first buffer memory, or else sub-step S409 is performed when the current visible surface is not to be rendered to the first buffer memory.

Sub-step S403 and sub-step S404 are not restricted to a specific order. That is to say, the dirty area of the current visible surface may be first calculated before determining to which buffer memory the current visible surface is to be rendered, or it may be first determined to which buffer memory the current visible surface is to be rendered before calculating the dirty area of the current visible surface.

In sub-step S405, the current visible surface is rendered to the first buffer memory.

According to the calculation result of the dirty area, the lowermost visible surface is rendered to the first buffer memory.

In sub-step S406, it is determined whether the current visible surface is the uppermost visible surface of all of the visible surfaces.

It is determined whether the current visible surface is the uppermost visible surface of all of the visible surfaces. Sub-step S407 is performed if so, or sub-step S408 is performed if not.

In sub-step S407, the first buffer memory and the second buffer memory are combined to output a result for display.

When the current visible surface is the uppermost visible surface of all of the visible surfaces, the first buffer memory and the second buffer memory are combined to output a result for display.

In sub-step S408, visible surfaces above the current visible surface are obtained.

When the current visible surface is not the uppermost visible surface of the all of the visible surfaces that need to be rendered, the visible surfaces above the current visible surfaces are obtain, and the process returns to sub-step S402 to iterate sub-step S402 and the subsequent operations.

In sub-step S409, the current visible surface is rendered to the second buffer memory.

When the current lowermost visible surface is not to be rendered to the first buffer memory, the current lowermost visible surface is rendered to the second buffer memory according to the calculation result of the dirty area. After completing sub-step S409, the process proceeds to sub-step S406 and the subsequent operations.

In practice, given the rendering of the first lowermost visible surface of the visible surfaces that need to be rendered is complete, when rendering other visible surfaces that need to be rendered, the visible surfaces that need to be rendered may be directly rendered to the first buffer memory as the first lowermost visible surface, thereby eliminating the step of determining whether to render to the first buffer memory or the second buffer memory. A reason for the above is that, when a change occurs in a visible surface, only other visible surfaces located in the same buffer memory as the visible surface with the change need to be rendered again, meaning that visible surfaces in other buffer memories are left unaffected.

Figure 5:
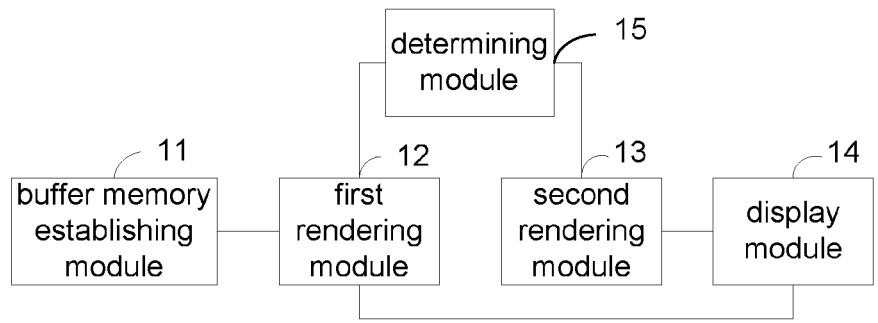
FIG. 5 is a schematic diagram of a rendering device according to an embodiment of the present invention.

Referring to FIG. 5, a rendering device according to an embodiment of the present invention includes a buffer memory establishing module 11, a first rendering module 12, a determining module 15, a second rendering module 13, and a display module 14.

The buffer memory establishing module 11 initializes a surface flinger to establish at least two buffer memories, and ensures that resolutions of the two established buffer memories are the same as a resolution of a current operating system.

The first rendering module 12 confirms correspondence between all visible surfaces and the at least two buffer memories established by the buffer memory establishing module 11, and respectively renders all of the visible surfaces to the corresponding buffer memories according to the correspondence. Further, from the lowermost visible surface, the first rendering module 12 respectively renders the all of the visible surfaces to the corresponding buffer memories according to the correspondence between all of the visible surfaces and the at least two buffer memories.

The determining module 15 determines whether a change occurs in the visible surfaces, and notifies the second rendering module 13 when a change occurs in the visible surfaces.

When a change occurs in the visible surfaces, the second rendering module 13 identifies the buffer memory where the visible surface with the change is located, and renders the visible surfaces that need to be rendered in the identified buffer memory. More specifically, when a change occurs in one of the visible surfaces after the visible surfaces are rendered to the at least two established buffer memories, the second rendering module 13 identifies the visible surface that need to be rendered from the buffer memory, and respectively renders the visible surfaces that need to be rendered from the lowermost visible surface in an upward direction.

After the first rendering module 12 or the second rendering module 13 completes rendering, the display module 14 combines the buffer memories to output a result for display.

The display module 14 combines all of the buffer memories and to output a result for display after the first rendering module 12 completes rendering all of the visible surfaces. Further, when a change occurs in one of the visible surfaces, the display module 14 combines all of the buffer memories to output a result for display after the second rendering module 13 completes rendering all of the visible surfaces that need to be rendered.

Figure 6:
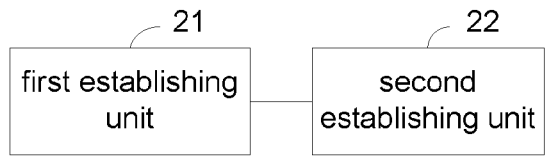
FIG. 6 is a schematic diagram of a buffer memory establishing module in a rendering device according to an embodiment of the present invention.

Referring to FIG. 6, the buffer memory establishing module includes a first establishing unit 21 and a second establishing unit 22.

The first establishing unit 21 initializes the surface flinger and establishes the display hardware.

The second establishing unit 22 establishes at least two buffer memories with the display hardware established by the first establishing unit 21.

Figure 7:
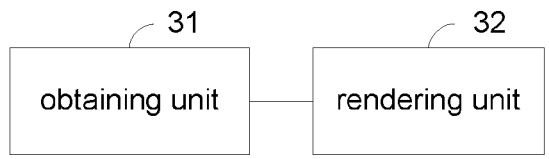
FIG. 7 is a schematic diagram of a second rendering module in a rendering device according to an embodiment of the present invention.

Referring to FIG. 7, the second rendering module of the present invention includes an obtaining unit 31 and a rendering unit 32.

When a change occurs in one of the visible surfaces, the obtaining unit 31 identifies the buffer memory where the visible surface with the change is located, and identifies the visible surface with the change and the visible surfaces above the visible surface with the change from the identified memory buffer as visible surfaces that need to be rendered.

That is, the obtaining unit 31 identifies the buffer memory where the visible surface with the change is located when a change occurs in one of the visible surfaces, and identifies the visible surfaces that need to be rendered again from the buffer memory.

The rendering unit 32 performs dirty area calculation on the visible surfaces that need to be rendered, and renders the visible surfaces that need to be rendered to the current buffer memory according to a result of the dirty area calculation.

More specifically, the rendering unit 32 performs dirty area calculation on the visible surfaces that need to be rendered and obtained by the obtaining unit 31, and respectively renders the visible surfaces that need to be rendered from the lowermost visible surface of the visible surfaces that need to be rendered in an upward direction to the current buffer memory.

Compared to the prior art, the present invention offers the following advantages. Multiple buffer memories are adopted for rendering, with the rendering process of each buffer memory being independent. When a change occurs in one of the buffer memories, only the visible surfaces in the buffer memory where the visible surface with the change are determined whether they are affected, and the quantity of visible surfaces that need to be rendered due to a rendering process of an upper-layer application can be significantly decreased. Further, when a visible surface with a change in a buffer memory needs to be rendered again, the rendering process is performed according to dirty area calculation, thereby reducing the loading and optimizing performance of the rendering process as well as enhancing system efficiency.

Based on the description of the embodiments above, one person skilled in the art should easily appreciate that the device and method disclosed by the present invention can be realized through other approaches. For example, the foregoing details for implementing the device are illustrative for better understanding the present invention. For example, in the above embodiments, the modules are individually defined based on respective logic functions, and may be implemented based on other definitions. For example, multiple modules or elements man be combined, or may be integrated to another system. Alternatively, certain features may be omitted or left unexecuted. Further, the relationship between objects displayed or discussed may be a direct connection or an indirect connection with a medium in between, and these connections may be in a signal, electrical or mechanical form, or in other forms.

The function modules described as separate parts may be or may not be physically separated; and the parts for display may be or may not be physical units, i.e., those parts may be located at one location or may be distributed at multiple network units. According to actual needs, a part or all units may be utilized to achieve the object of the present invention.

Further, the function modules described in the above embodiments of the present invention may be integrated into one processing unit or may be physically independent. Alternatively, two or more of these function modules may be integrated into one unit. The integration for the units may be implemented in form of hardware or in form of software function units.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rendering method, comprising:
   initializing a surface flinger to establish at least two buffer memories;
   confirming correspondence between all visible surfaces and the at least two buffer memories, respectively rendering all of the visible surfaces to the corresponding buffer memories according to the correspondence, and combining all of the buffer memories to output a result for display, wherein at least some of the visible surfaces are stacked one above the other;

determining whether a change occurs in the visible surfaces, and identifying the buffer memory where the visible surface with the change is located when the change occurs in the visible surfaces; and rendering again the visible surfaces that need to be rendered in the identified buffer memory, and combining the buffer memory that is rendered again with the buffer memory that is not rendered again to output a result for display, wherein the step of rendering again the visible surfaces that need to be rendered in the identified buffer memory comprises:

rendering other visible surfaces overlapping with the visible surface with the change within the identified buffer memory, wherein the step of confirming the correspondence between all of the visible surfaces and the at least two buffer memories comprises:

obtaining all of the visible surfaces, and determining a first visible surface from all of the visible surfaces, the first visible surface being a visible surface with a highest refresh frequency of all of the visible surfaces;

mapping the first visible surface and the visible surfaces above the first visible surface to one of the at least two buffer memories;

determining whether a number of times of mapping the visible surfaces to the buffer memory reaches a threshold, the threshold being a difference between a quantity of the at least two buffer memories and one; and when the number of times of mapping the visible surfaces to the buffer memory does not reach the threshold, obtaining the remaining visible surfaces, determining a second visible surface from the remaining visible surfaces, the second visible surface being a visible surface with a highest refresh frequency of the remaining visible surfaces, mapping the second visible surface and the visible surfaces above the second visible surface to one other of the at least two buffer memories, and returning to the step of determining whether the number of times of mapping the visible surfaces to the buffer memory reaches the threshold; and when the number of times of mapping the visible surfaces to the buffer memory reaches the threshold, mapping the remaining visible surfaces to the remaining one of the at least two buffer memories until the correspondence between all of the visible surfaces and the at least two buffer memories is confirmed.

2. The method according to claim 1, wherein the step of initializing the surface flinger to establish the at least two buffer memories comprises:

initializing the surface flinger to establish display hardware; and establishing the at least two buffer memories by the established display hardware;

wherein, resolutions of the at least two buffer memories and a resolution of a current operating system are the same.

3. The method according to claim 1, wherein the step of rendering again the visible surfaces that need to be rendered in the identified buffer memory comprises:

identifying the visible surface with the change from the buffer memory and the visible surfaces above the visible surface with the change as the visible surfaces that need to be rendered again;

obtaining a lowermost visible surface of the visible surfaces that need to be rendered again;

performing dirty area calculation on the lowermost visible surface, and rendering the current lowermost visible surface to the current buffer memory according to a result of the dirty area calculation; and obtaining the remaining visible surfaces of the visible surfaces that need to be rendered again, and iterating the above steps until completing the step of rendering all of the visible surfaces that need to be rendered again to the corresponding buffer memories.

4. The method according to claim 1, wherein the step of respectively rendering all of the visible surfaces to the corresponding buffer memories according to the correspondence comprises:

from the lowermost visible surface of the visible surfaces, respectively mapping the visible surfaces to the corresponding buffer memories in an upward direction according to the correspondence.

5. A rendering device, comprising:

a buffer memory establishing module, configured to initialize a surface flinger to establish at least two buffer memories;

a first rendering module, configured to confirm correspondence between all visible surfaces and the at least two buffer memories, and to respectively render all of the visible surfaces to the corresponding buffer memories according to the correspondence, wherein at least some of the visible surfaces are stacked one above the other;

a determining module, configured to determine whether a change occurs in the visible surfaces;

a second rendering module, configured to identify the buffer memory where the visible surface with the change is located when the change occurs in the visible surfaces, and to render again the visible surfaces that need to be rendered in the identified buffer memory; and a display module, configured to combine all of the buffer memories to output a result for display after the first rendering module and the second rendering module complete rendering, wherein the second rendering module is further configured to render other visible surfaces overlapping with the visible surface with the change within the identified buffer memory, wherein the rendering module is configured to confirm correspondence between all visible surfaces and the at least two buffer memories by:

obtaining all of the visible surfaces, and determining a first visible surface from all of the visible surfaces, the first visible surface being a visible surface with a highest refresh frequency of all of the visible surfaces;

mapping the first visible surface and the visible surfaces above the first visible surface to one of the at least two buffer memories;

determining whether a number of times of mapping the visible surfaces to the buffer memory reaches a threshold, the threshold being a difference between a quantity of the at least two buffer memories and one; and when the number of times of mapping the visible surfaces to the buffer memory does not reach the threshold, obtaining the remaining visible surfaces, determining a second visible surface from the remaining visible surfaces, the second visible surface being a visible surface with a highest refresh frequency of the remaining visible surfaces, mapping the second visible surface and the visible surfaces above the second visible surface to one other of the at least two buffer memories, and returning to the step of determining whether the number of times of mapping the visible surfaces to the buffer memory reaches the threshold; and when the number of times of mapping the visible surfaces to the buffer memory reaches the threshold, mapping the remaining visible surfaces to the remaining one of the at least two buffer memories until the correspondence between all of the visible surfaces and the at least two buffer memories is confirmed.

6. The device according to claim 5, wherein the buffer memory establishing module comprises:
   a first establishing unit, configured to initialize the surface flinger to establish display hardware; and
   a second establishing unit, configured to establish the at least two buffer memories with the display hardware established by the first establishing unit.

7. The device according to claim 5, wherein the second rendering module comprises:
   an obtaining unit, configured to identify the visible surface with the change from the buffer memory and the visible surfaces above the visible surface with the change as the visible surfaces that need to be rendered again when the change occurs in the visible surfaces; and
   a rendering unit, configured to perform dirty area calculation on the lowermost visible surface, and to render the current lowermost visible surface to the current buffer memory according to a result of the dirty area calculation.

8. The device according to claim 5, wherein the first rendering module is configured to confirm the correspondence between all of the visible surfaces and the at least two buffer memories established by the buffer memory establishing module, and to respectively render the visible surfaces to the corresponding buffer memories in an upward direction from the lowermost visible surface of the visible surfaces according to the correspondence.

* * * * *